(12) United States Patent
Goodwill et al.

(10) Patent No.: US 7,286,755 B1
(45) Date of Patent: Oct. 23, 2007

(54) METHOD AND APPARATUS FOR TESTING AN OPTICAL COMPONENT

(75) Inventors: Dominic John Goodwill, Kanata (CA); Eric Bernier, Kanata (CA); Mirjana Vukovic, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 248 days.

(21) Appl. No.: 10/797,071

(22) Filed: Mar. 11, 2004

Related U.S. Application Data (60) Provisional application No. 60/453,206, filed on Mar. 11, 2003.

(51) Int. Cl.
*H04B 10/08* (2006.01)
*H04B 10/00* (2006.01)

(52) U.S. Cl. .................. 398/26; 398/25; 398/33; 359/161; 359/341; 385/142

(58) Field of Classification Search ............... 398/164, 398/154, 54, 73; 385/16–18, 24; 359/16, 359/109–111, 117, 341; 370/232, 358, 235–236, 370/427, 542; 250/214 A, 214 LA, 214.1, 250/214 R; 356/218, 73
See application file for complete search history.

(56) References Cited

U.S. PATENT DOCUMENTS

| | | | |
|---|---|---|---|
| 6,188,674 B1 * | 2/2001 | Chen et al. ................. 370/252 |
| 6,366,716 B1 | 4/2002 | Graves | |
| 6,486,983 B1 * | 11/2002 | Beshai et al. ................. 398/54 |
| 6,563,835 B1 * | 5/2003 | Chen ......................... 370/410 |
| 6,590,644 B1 * | 7/2003 | Coin et al. .................. 356/218 |
| 6,606,427 B1 * | 8/2003 | Graves et al. ................. 385/17 |
| 6,660,990 B2 * | 12/2003 | Boertjes et al. ......... 250/214 A |
| 6,694,070 B2 * | 2/2004 | Gottlieb et al. ............... 385/16 |
| 6,700,896 B1 * | 3/2004 | Beshai ....................... 370/427 |
| 6,711,357 B1 * | 3/2004 | Brewer et al. ................. 398/54 |
| 6,731,832 B2 * | 5/2004 | Alvarez et al. ............... 385/16 |
| 6,876,629 B2 * | 4/2005 | Beshai et al. ............... 370/232 |
| 6,950,215 B2 * | 9/2005 | Fant et al. .................... 359/16 |

* cited by examiner

*Primary Examiner*—Sang H. Nguyen
(74) *Attorney, Agent, or Firm*—Jeffrey M. Measures; Borden Ladner Gervais LLP (57) ABSTRACT

The present invention relates to a system for testing the connection paths of a switch fabric by using a spontaneously emitted signal as a test signal. The system includes at least one first module and at least one second module, wherein each one of the second modules is associated to one of the first modules through a connection path in the switch fabric. Each of the first modules is capable of obtaining a respective first measurement of a characteristic of the spontaneously emitted signal supplied to the switch fabric, and each of the second modules is capable of obtaining a respective second measurement of the characteristic of the spontaneously emitted signal. The system further includes a processing module in communication with each of the first and second modules for determining a feature of the optical component based on the first and second measurements.

57 Claims, 5 Drawing Sheets

METHOD AND APPARATUS FOR TESTING AN OPTICAL COMPONENT

This application claims benefit of application Ser. No. 60/453,206 filed Mar. 11, 2003.

FIELD OF THE INVENTION

The present invention relates to the field of optical component testing and, more specifically, to a method and apparatus for verifying connection paths through a switch fabric.

BACKGROUND OF THE INVENTION

Photonic switches are used in order to redirect and transmit optical traffic signals between nodes of an optical network. At the heart of a photonic switching network lies a photonic switch fabric, which provides switching of optical traffic signals without the need for conversion of the signals to electrical form. Therefore, it is important to know when the switch fabric is no longer working properly since it will affect the workings of the network. As such, it is important to frequently verify the integrity of the connection paths within the switch fabric in order to ensure that the switch fabric is switching the optical traffic signals according to a desired mapping, and to further ensure that the power loss of the signals passing through the connection paths does not exceed an acceptable level.

A common method of testing switch fabrics is to inject an extraneous optical test signal into a particular connection path of the switch fabric and take measurements of that extraneous optical test signal both before and after it has been injected into the switch fabric. By comparing the level of similarity of the measurements taken before and after the extraneous optical test signal has traveled through the particular connection path, the validity and power loss of the particular connection path can be determined.

However, a deficiency with the aforementioned method of verifying switch fabric connection paths is that the verification process can only take place while the connection path is not being used as an active connection path. Therefore, in order to test a selected connection path, the extraneous optical test signal must be injected within a connection path that is not being used to transmit an optical traffic signal. As such, a switch fabric connection path cannot both be tested and convey an optical traffic signal at the same time.

A further deficiency with the aforementioned method of switch fabric verification is that additional hardware components must be provided in order to generate the extraneous optical test signal. These additional components include, at a minimum, a source of extraneous light, which takes up space. Moreover, these additional components add to the cost of the photonic switch.

It can be seen that there is a need in the industry for an improved technique for performing switch fabric verification.

SUMMARY OF THE INVENTION

The present invention relates to a system for testing the connection paths of a switch fabric by using a spontaneously emitted signal as a test signal.

Accordingly, as embodied and broadly described herein, the present invention provides a system for testing an optical component. The system includes at least one first module and at least one second module, wherein each one of the second modules is associated to one of the first modules. Each of the first modules is capable of obtaining a respective first measurement of a characteristic of a spontaneously emitted signal that is supplied to the optical component, and each of the second modules is capable of obtaining a respective second measurement of the characteristic of the spontaneously emitted signal for which a respective first measurement was obtained by its associated first module. The respective second measurement is obtained upon receipt of the spontaneously emitted signal from the optical component. The system further includes a processing module that is in communication with each of the first modules and each of the second modules for determining a feature of the optical component based on the first and second measurements.

In a non-limiting embodiment of the present invention, the spontaneously emitted signal may be generated by an optical amplifier, the optical amplifier also functioning to amplify a plurality of optical traffic signals.

Advantageously, the above-described system avoids the need for additional hardware components for producing a test signal, and enables the connection paths of the switch fabric to be both tested and able to convey optical traffic signals at the same time.

As further embodied and broadly described herein, the present invention provides a system as described above, further including the optical component.

As still further embodied and broadly described herein, the present invention provides a method for testing an optical component. The method involves obtaining at a first module a first measurement of a characteristic of a spontaneously emitted signal that is to be supplied to the optical component. Once the first measurement is obtained, the method further involves receiving at a second module the spontaneously emitted signal from the optical component. A second respective measurement is then obtained at a second module associated to the first module. The respective second measurement is a measurement of the characteristic of the spontaneously emitted signal for which the first respective measurement of the characteristic was obtained at the associated first module. The respective second measurement is obtained upon reception of the spontaneously emitted signal from the optical component. Finally, the method involves comparing the first and second respective measurements of the characteristic of the spontaneously emitted signal taken at the first and second modules to determine a feature of the optical component.

BRIEF DESCRIPTION OF THE DRAWINGS

A detailed description of examples of implementation of the present invention is provided herein below with reference to the following drawings, in which.

In the drawings, embodiments of the invention are illustrated by way of example. It is to be expressly understood that the description and drawings are only for the purposes of illustration, and are not intended to be a definition of the limits of the invention.

DETAILED DESCRIPTION

Figure 1:
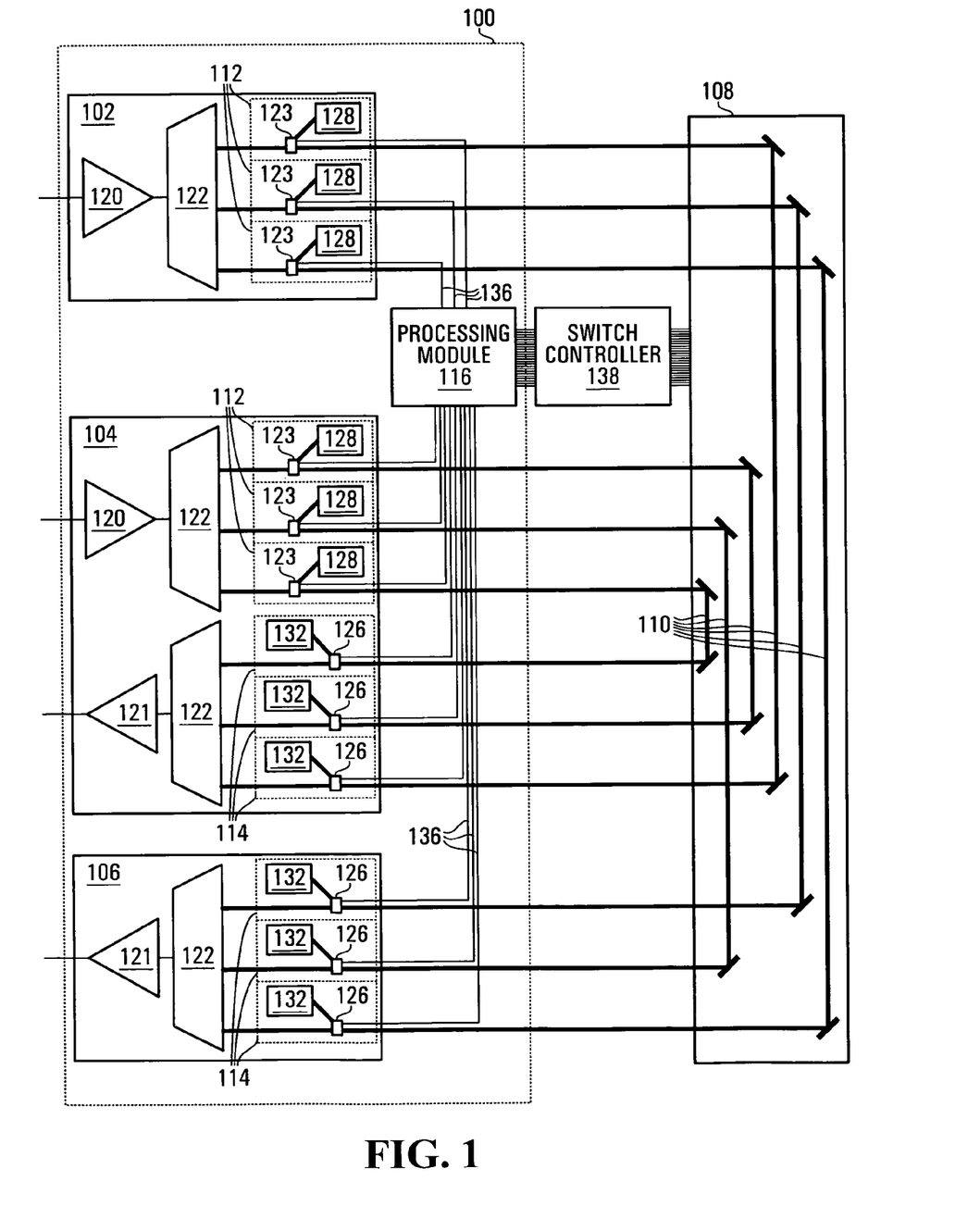
FIG. 1 shows, in block diagram form, a system for testing an optical component in accordance with a specific embodiment of the present invention.

Shown in FIG. 1 is a system 100 for testing an optical component in accordance with a specific embodiment of the present invention. For the purposes of this description, the optical component in question is a photonic switch fabric 108. It should, however, be understood that the present invention can be used for testing other optical components without departing from the spirit of the invention.

System 100 includes a plurality of ingress modules 112, a plurality of egress modules 114, and a processing module 116 that is in communication with the ingress modules 112 and the egress modules 114 through communication lines 136. Although a plurality of ingress modules 112 and a plurality of egress modules 114 are shown in FIG. 1, it should be understood that a system 100 that includes only a single ingress module 112 and a single egress module 114 in communication with the processing module 116 is also within the scope of the present invention.

In the specific example of implementation shown in FIG. 1, the plurality of ingress modules 112 and the plurality of egress modules 114 are distributed amongst three photonic line cards 102, 104 and 106. Although three line cards are shown, more or fewer line cards can be included without departing from the spirit of the invention. In addition, the distribution of ingress and egress modules 112, 114 amongst the respective line cards can also vary. For example, the line cards can include only first modules, as in the case of line card 102, only egress modules 114, as in the case of line card 106, or both ingress and egress modules 112 and 114, as in the case of line card 104.

Line cards 102, 104 and 106 shown in FIG. 1 can be referred to as photonic trunk line cards. These can be equipped with ingress optical amplifiers 120, egress optical amplifiers 121 and multiplexers 122. Photonic trunk line cards are so termed because of their ability to receive light of multiple wavelengths from a network fiber, and separate the multiple wavelength light into multiple single wavelength lights using the multiplexer 122, for example. A multiplexer 122 may also be used for the purpose of combining multiple single wavelength lights into a multiple wavelength light to a network fiber, such a usage being indicated within the line card 104 by the multiplexer 122 that is connected to the egress amplifier 121. For the purpose of this invention, a multiplexer 122 shall thus be understood to contain the function of combining wavelengths, or the function of separating wavelengths, or the function of both combining and separating wavelengths.

Figure 2:
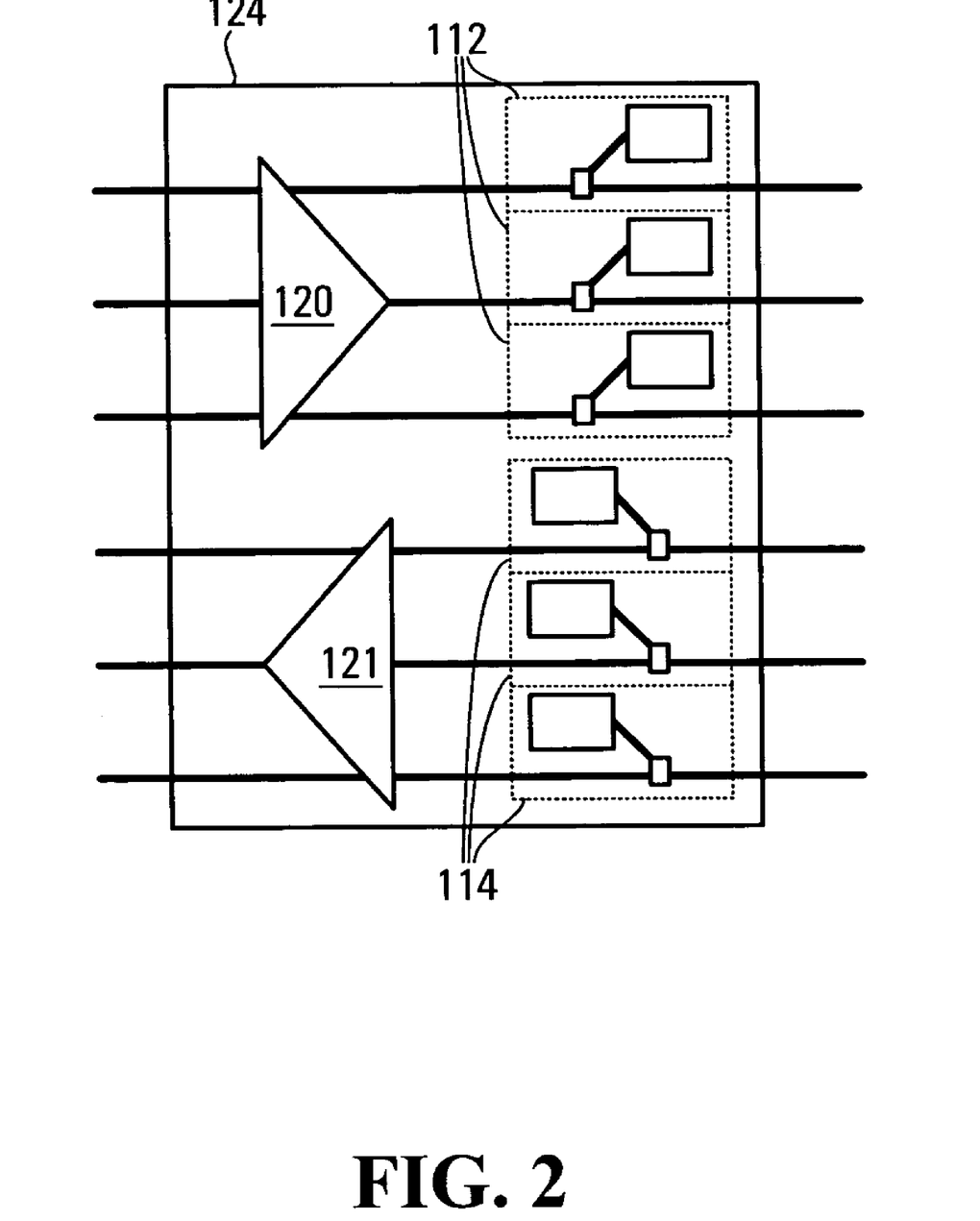
FIG. 2 shows an expanded view of a tributary line card in the system of FIG. 1.

Alternatively, photonic tributary line cards can be used for the purposes of this invention. FIG. 2 shows an example of a photonic tributary line card 124 including an ingress optical amplifier 120, an egress optical amplifier 121, three ingress modules 112 and three egress modules 114. Photonic tributary line cards are able to receive light from several network fibers, each network fiber carrying an optical traffic signal occupying only one wavelength. As such, in the case of photonic tributary line cards, a wavelength division multiplexer is not required.

In the cases of both the trunk line cards 102, 104 and 106 and the tributary line cards 124, the optical traffic signal or signals being received at the ingress modules 112 have passed through an ingress optical amplifier 120, which has the effect of creating optical noise and adding the optical noise, otherwise known as an amplified spontaneous emission (ASE), to the optical traffic signal travelling therethrough. It should be understood that the ingress optical amplifier 120 creates noise that will appear on the optical fiber entering the switch fabric 108, regardless of whether there is actually any optical traffic signal travelling through the optical fiber. In accordance with an embodiment of the present invention, it is this omnipresent amplified spontaneous emission that is used as a test signal to verify the operation of the switch fabric 108. It should be understood that any spontaneously emitted signal can be used as the test signal, and that the test signal does not necessarily have to be the industry accepted amplified spontaneous emission (ASE).

From the above description, it will be apparent to one skilled in the art that the ingress optical amplifier 120 may advantageously function both as a source of the spontaneously emitted light for the test signal and as an amplifier of the optical traffic signals.

Different types of optical amplifiers known in the art can be used as the ingress optical amplifiers 120 for the purposes of this invention. Some non-limiting examples of suitable ingress optical amplifiers include erbium-doped fiber amplifiers (EDFAs), semiconductor optical amplifiers (SOAs), Raman amplifiers and erbium-doped waveguide amplifiers (EDWAs). The only requirement of an "ingress optical amplifier" 120, for the purposes of this invention, is that it produce ASE, which is the case with all of the aforementioned amplifiers and others known to those of ordinary skill in the art. In addition, it should be understood that the ingress optical amplifiers 120 need not be positioned on the line cards 102, 104, 106. The only requirement for the position of an ingress optical amplifier 120, for the purposes of this invention, is that it be located "before" an ingress module 112, such that the ingress module 112 can obtain a measurement of the ASE.

It should be further understood that the ingress optical amplifiers 120 and egress optical amplifiers 121 may each consist of a single amplifying element, or may consist of multiple amplifying elements in parallel, and that each amplifying element may itself consist of a plurality of sequential amplifying stages.

It should be understood that although the ingress modules 112 and egress modules 114 shown in FIGS. 1 and 2 are embedded within photonic line cards, this is not a necessary requirement for the operation of the invention. Instead, the ingress and egress modules 112, 114 can be located elsewhere. For example, the ingress and egress modules 112, 114 can be positioned between the line cards 102, 104, 106 and the switch fabric 108, or alternatively, there may be no line cards at all, and the ingress and egress modules 112, 114 can be stand-alone modules. In the case where there are no line cards, the ingress and egress modules 112, 114 could include their own ingress optical amplifiers 120 and multiplexers 122, as required.

As mentioned above, in the specific example of implementation described herein, the optical component being tested is a photonic switch fabric 108. A switch controller 138 is connected to the photonic switch fabric 108 and is able to selectively establish connection paths 110 within the photonic switch fabric 108 for conveying optical traffic signals. The switch controller 138 is further adapted to communicate with the processing module 116 in order to inform the processing module 116 of which ingress module 112 and which egress module 114 are associated to which connection path 110. Photonic switch fabrics 108 and switch controllers 138 are well known in the art and as such will not be described in further detail herein.

In operation, the ingress modules 112 are adapted to obtain a first measurement of a characteristic of the amplified spontaneous emission created by the ingress optical amplifier 120, prior to the amplified spontaneous emission being supplied to the switch fabric 108. In the specific example of implementation shown in FIGS. 1 and 2, ingress modules 112 include an optical tap 123 for diverting a portion of the amplified spontaneous emission towards an optical monitor 128. The optical monitor 128 is able to obtain a first measurement of a characteristic of the amplified spontaneous emission. Preferably, the optical monitor 128 has a high dynamic range since the ASE, in general, is designed to be much lower than the power of the optical traffic signal. Therefore, in one specific example of implementation, the optical monitor 128 is an optical power monitor with a dynamic range of greater than 30 dB. The characteristic of the amplified spontaneous emission that is measured by the optical monitor 128 may thus be the power or intensity of the amplified spontaneous emission.

Each ingress module 112 is associated to an egress module 114 by virtue of an associated connection path 110 through the optical component. As such, the amplified spontaneous emission travels through a connection path 110 associated to the particular ingress module 112 that obtained the first measurement of the characteristic of the amplified spontaneous emission. Once the amplified spontaneous emission has traveled through the associated connection path 110, it is intercepted by the egress module 114 associated to that connection path 110. The egress module 114 is adapted to obtain a second measurement of the amplified spontaneous emission for which the associated ingress module 112 took a first measurement. In the specific example of implementation shown in FIGS. 1 and 2, each of the egress modules 114 also includes an optical tap 126 for diverting a portion of the amplified spontaneous emission towards an optical monitor 132. The optical monitor 132 then obtains a second measurement of a characteristic of the amplified spontaneous emission. For the same reasons as explained with respect to the optical monitors 128, in a specific example of implementation, the optical monitors 132 have a dynamic range of greater than 30 dB.

Figure 3:
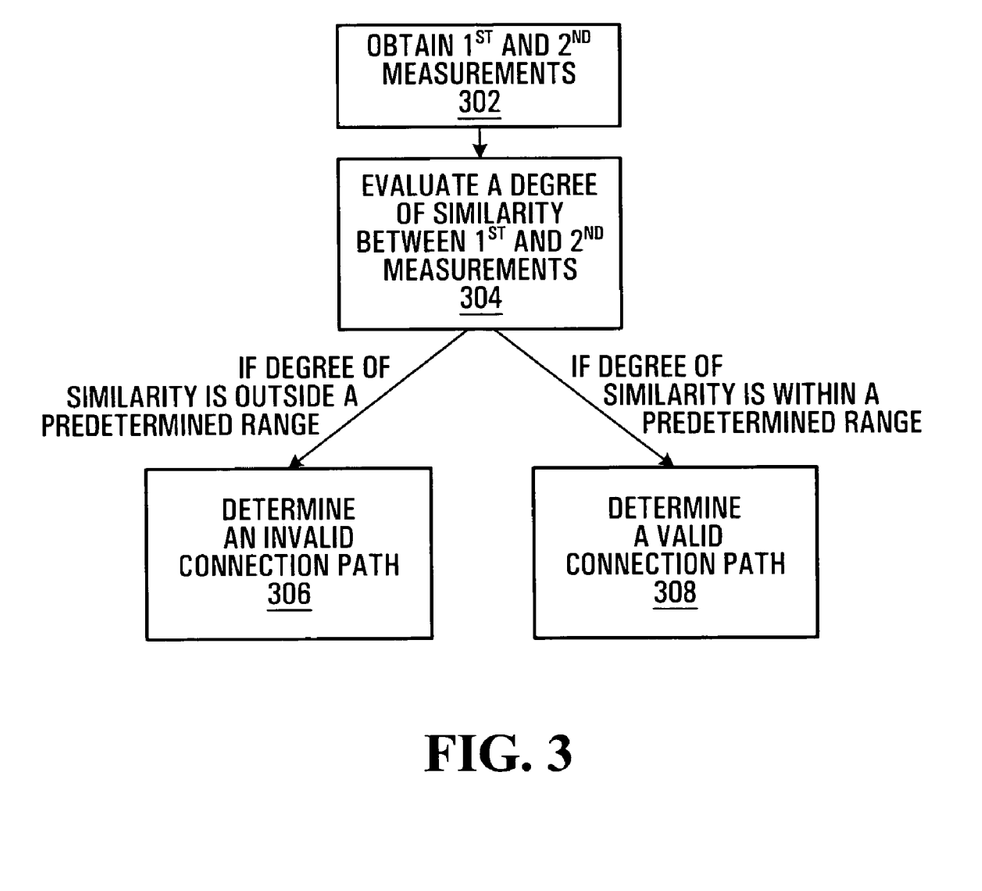
FIG. 3 shows a block diagram of a process for determining the validity of a selected connection path in accordance with a specific embodiment of the present invention.

With reference to FIG. 3, a first verification operation of the processing module 116 will be described. As stated above, processing module 116 is adapted to be in communication with the plurality of ingress modules 112 and the plurality of egress modules 114 through communication lines 136. As such, it is the processing module 116 that decides which connection path 110 through switch fabric 108 will be verified or tested at any given time. In order to do so, the processing module 116 obtains from the ingress and egress modules 112, 114 the first and second measurements of the characteristic of the amplified spontaneous emission that traveled the selected connection path 110. At step 304 the processing module 116 evaluates the degree of similarity between the two measurements in order to determine a feature of the switch fabric 108.

In one specific embodiment of the present invention, the feature of the switch fabric 108 being determined is the power loss across a selected connection path 110. In such cases the degree of similarity between the first and second measurements evaluated by the processing module 116 is the actual power loss over the connection path.

In a further specific embodiment of the present invention, the feature of the switch fabric 108 that is determined by the processing module 116 is the validity of the selected connection path 110.

As a specific example of implementation, the degree of similarity between the first measurement and the second measurement is evaluated by subtracting the second measurement from the first measurement. Alternatively, the degree of similarity can be evaluated by taking a ratio of the first measurement to the second measurement. It should however be understood that any other method of evaluating a degree of similarity between the two measurements could be used without departing from the spirit of the invention.

Once the degree of similarity between the first and second measurements has been established, the processing module 116 compares the degree of similarity evaluated to a predetermined range of values. It should be understood that for the purposes of this application, the term "a predetermined range of values" can include one or more discrete values or a continuum between two chosen values. If the degree of similarity evaluated falls within the predetermined range, then the processing module 116 determines at step 308 a first feature of the switch fabric 108, such as the feature of a valid connection path 110. Alternatively, if the degree of similarity evaluated falls outside the predetermined range, then the processing module 116 determines at step 306 a second feature of the switch fabric, such as an invalid connection path or an invalid power loss.

A specific, non-limiting example of a predetermined range against which the degree of similarity is compared could be the value "zero". In the cases where the degree of similarity is obtained by taking the difference between the first measurement and the second measurement, a value of zero denotes that the value of the first measurement is exactly the same as the value of the second measurement. This could result in the processing module 116 determining that the selected connection path 110 is valid. Alternatively, if the difference between the first measurement and the second measurement is very high, and well outside the predetermined range of zero, it would denote that the second measurement was very low or non-existent. This could result in the processing module 116 determining that the selected connection path 110 is invalid.

In an alternative embodiment, the processing module 116 does not require a first measurement of the characteristic of the amplified spontaneous emission to be taken in order to determine the validity of a selected connection path. In a specific example of implementation, the absence of a first measurement could be permitted when the amplified spontaneous emission entering the switch fabric 110 is of a known value. In such cases, the processing module simply determines a degree of similarity between the second measurement obtained at the egress module and a reference value. If the degree of similarity falls within a predetermined range of values, then the processing module 116 concludes validity of the power loss of the selected connection path, and if the degree of similarity falls outside the predetermined range of values, then the processing module 116 concludes invalidity of the power loss of the selected connection path. For example, if the characteristic being measured is power, and the predetermined range is 150 to 170 picoWatts (pW), then if the degree of similarity is found to be 168 pW, the processing module 116 determines a valid power loss of the connection path, however, if the degree of similarity is found to be zero, which falls outside of the predetermined range, the processing module 116 determines an invalid power loss of the connection path.

For the purposes of this application the term "validity of the connection path" refers to the completed travel of an amplified spontaneous emission through the selected connection path 110. Therefore, when a selected connection path is determined to be valid, it means that the amplified spontaneous emission was able to travel from the ingress module 112 to the egress module 114 associated to the selected connection path. However, when a selected connection path is determined to be invalid, it means that the amplified spontaneous emission was unable to travel from the ingress module 112 to the egress module 114 associated to the selected connection path. Further, the term "validity of the power loss" indicates that sufficient amplified spontaneous emission was able to travel to the egress module, and the term "invalidity of the power loss" indicates that insufficient amplified spontaneous emission was received at the egress module 114. Thus, as non-limiting examples, a selected connection path may be invalid, indicating a mis-connection; a selected connection path may have invalid power loss, indicating that the connection has been established correctly but is of performance below a previously defined specification; a selected connection path may have a valid connection path and a valid power loss, indicating that the connection path is fit for use.

In a further specific example of implementation, the ingress optical amplifiers 120 are able to insert individual modulation signatures on each of the amplified spontaneous emissions being supplied to the switch fabric 108. As such, the processing module 116 is able to determine a first modulation signature at an ingress module 112 associated to a selected connection path, and is able to determine a second modulation signature at the egress module 114 associated to the same selected connection path 110. Specific non-limiting examples of modulation signatures include network-globally unique ID's, node-locally-unique ID's or non-unique ID's.

Using these modulation signatures, the processing module 116 is able to perform a second verification operation by comparing the two modulation signatures and establishing a degree of similarity therebetween. Based on the degree of similarity between the two modulation signatures, the processing module 116 is able to determine whether or not a successful communication over the selected connection path 110 actually took place. It should, however, be understood that the first and second verification operations can be performed contemporaneously.

Figure 4:
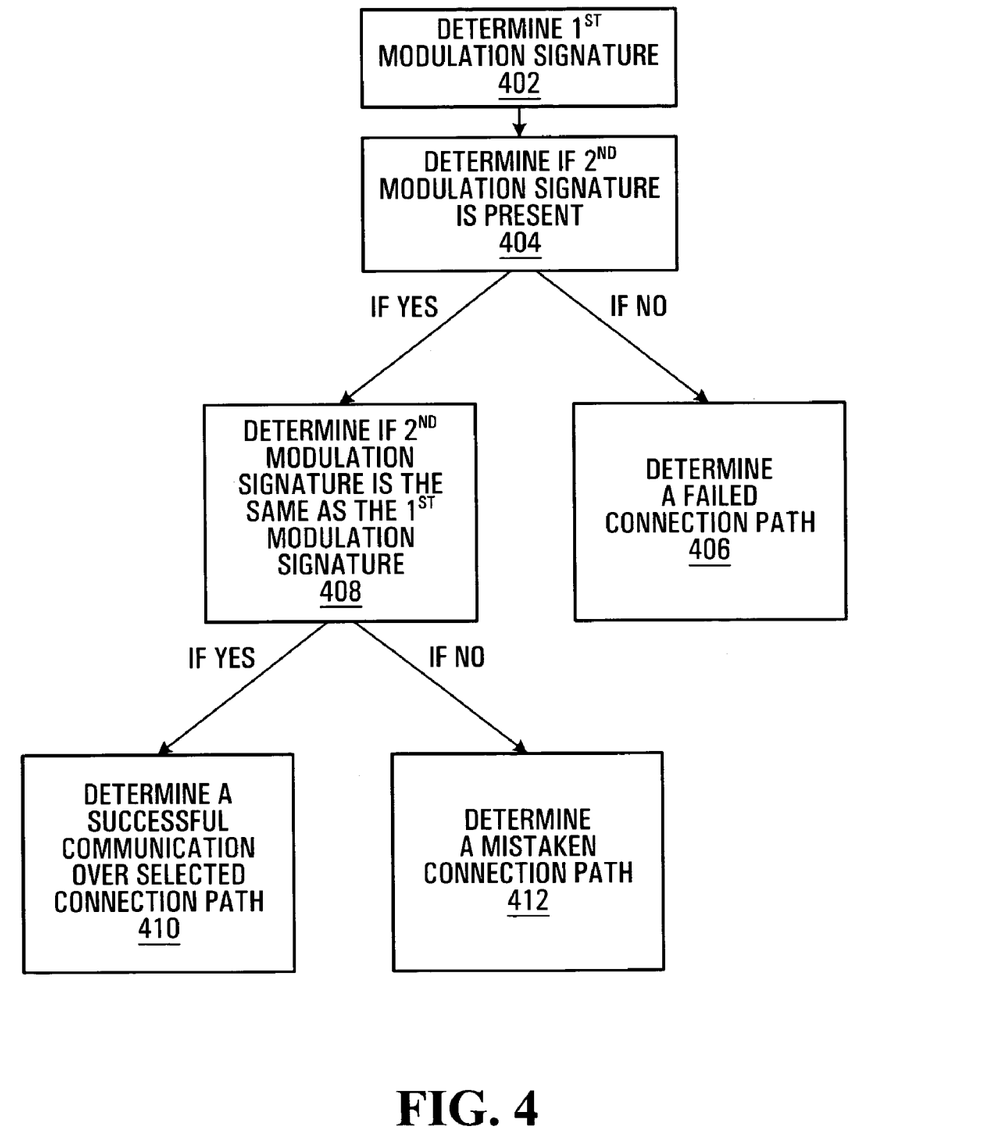
FIG. 4 is a block diagram of the process for determining if a successful communication has been established over the selected connection path.

Referring to FIG. 4, a more detailed version of the second verification operation is described below. At step 402, the processing module 116 determines at an ingress module 112 associated to a selected connection path 110 a first modulation signature of an amplified spontaneous emission. At step 404, the processing module 116 determines at the egress module 114 whether a second modulation signature is present on the amplified spontaneous emission received from the switch 108. If no second modulation signature is present, the processing module determines at step 406 that there was a failed connection over the selected connection path 110, meaning that the amplified spontaneous emission for which a first modulation signature was determined at the ingress module 112 did not make it through the selected connection path 110 to the egress module 114.

Alternatively, if a second modulation signature is present at the egress module 114, the processing module 116 determines at step 408 whether or not the second modulation signature is the same as the first modulation signature determined at the associated ingress module 112. If it is determined at step 408 that the second modulation signature matches the first modulation signature, the processing module 116 determines at step 410 that there was a successful communication over the selected connection path 110, meaning that the amplified spontaneous emission that entered the selected connection path 110 is the same amplified spontaneous emission that exited the selected connection path 110. Alternatively, if the first and second modulation signatures are not the same, then the processing module 116 determines at step 412 that there is a mistaken connection over the selected connection path 110, meaning that the amplified spontaneous emission that entered the selected connection path 110 is not the same amplified spontaneous emission that exited the selected connection path 110. This could be the result of two amplified spontaneous emissions getting mixed up within the switch fabric 108, or the switch controller 138 providing incorrect information to the processing module 116 about which ingress module 112 and which egress module 114 are associated to the selected connection path 110.

Advantageously, the second verification operation enables the system to ascertain that the amplified spontaneous emission being measured at the first module 112 is in fact the same amplified spontaneous emission being measured at the second module 114. This provides an additional level of assurance that the switch fabric 108 is operating properly.

Those skilled in the art should appreciate that in some embodiments of the invention, all or part of the functionality previously described herein with respect to the processing module 116 may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to the processing module 116 may be implemented as software consisting of a series of instructions for execution by a computing unit. The series of instructions could be stored on a medium which is fixed, tangible and readable directly by the computing unit, (e.g., removable diskette, CD-ROM, ROM, PROM, EPROM or fixed disk), or the instructions could be stored remotely but transmittable to the computing unit via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Figure 5:
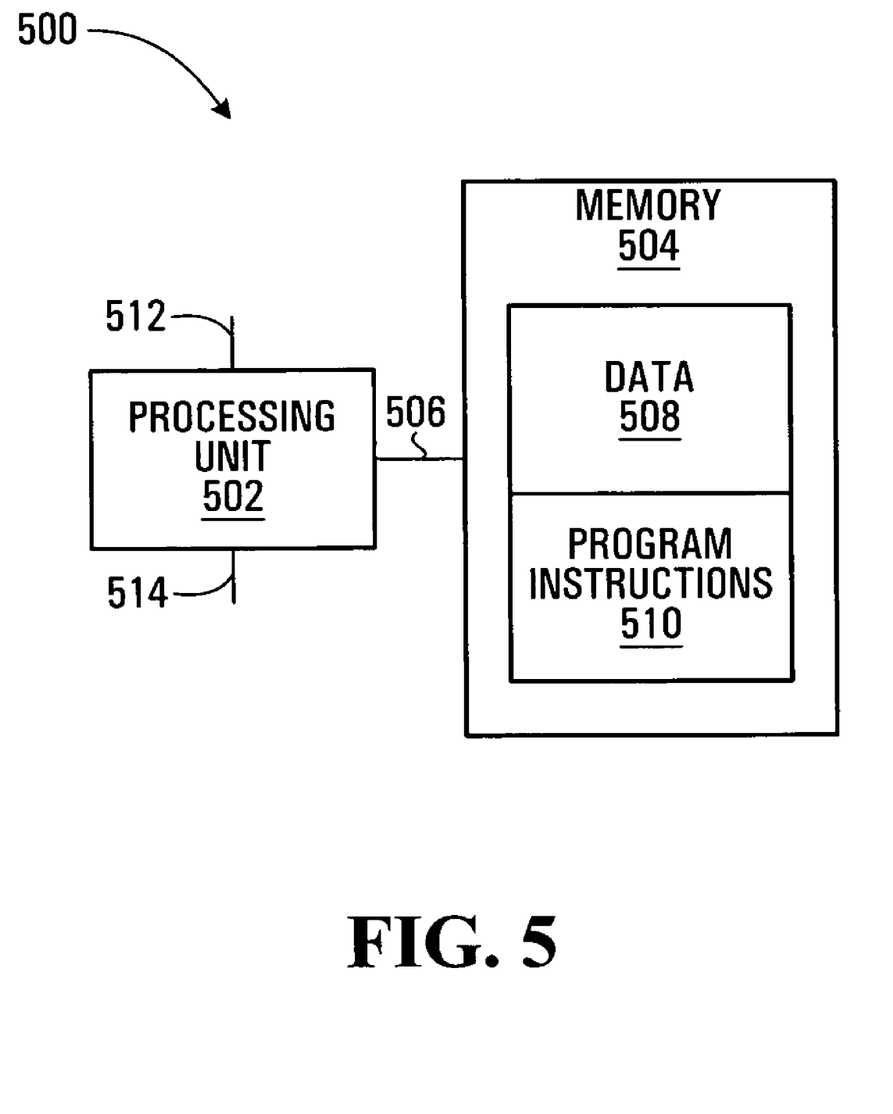
FIG. 5 shows a computing unit for implementing a processing module in accordance with a specific embodiment of the present invention.

The computing unit implementing processing module 116 may be configured as a computing unit 500 of the type depicted in FIG. 5, including a processing unit 502 and a memory 504 connected by a communication bus 506. The memory includes data 508 and program instructions 510. The processing unit 502 is adapted to process the data 508 and the program instructions 510 in order to implement the procedures described in the specification. The computing unit 500 may also comprise I/O interfaces 512/514 for receiving or sending data elements to external devices. For example, in a specific example of implementation interface 512 is for receiving connection path information from switch controller 138.

Those skilled in the art should further appreciate that the program instructions 510 may be written in a number of programming languages for use with many computer architectures or operating systems. For example, some embodiments may be implemented in a procedural programming language (e.g., "C") or an object oriented programming language (e.g., "C++" or "JAVA").

It will be appreciated that the system for verifying an optical component as described above may be of a distributed nature where the connection path information is collected at one location and transmitted to a computing unit implementing the system 100 over a network. The network may be any suitable network including but not limited to a global public network such as the Internet, a private network and a wireless network. In addition, the computing unit implementing the system 100 may be adapted to process multiple connection paths originating from multiple optical components concurrently using suitable methods known in the computer related arts.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A system for testing an optical component, said system comprising:
   a) at least one first module capable of obtaining a respective first measurement of a characteristic of a spontaneously emitted signal that is supplied to the optical component;
   b) at least one second module, wherein each one of said at least one second module is associated to one of said at least one first module, said at least one second module capable of obtaining a respective second measurement of the characteristic of the spontaneously emitted signal for which a respective first measurement of the characteristic was obtained by its associated first module, the respective second measurement being obtained upon reception of the spontaneously emitted signal from the optical component;
   c) a processing module in communication with said at least one first module and said at least one second module for determining a feature of the optical component based on the first and second measurements.

2. A system as defined in claim 1, wherein said at least one first module includes a plurality of first modules and said at least one second module includes a plurality of second modules.

3. A system as defined in claim 2, wherein each second module from said plurality of second modules is associated to a first module from said plurality of first modules by virtue of an associated connection path through the optical component, said processing module being capable of obtaining knowledge of all of the connection paths.

4. A system as defined in claim 3, wherein said optical component is a switch fabric.

5. A system as defined in claim 4, wherein said switch fabric is a photonic switch fabric.

6. A system as defined in claim 3, wherein the feature of the optical component determined by said processing module is the validity of a selected one of the connection paths.

7. A system as defined in claim 3, wherein the feature of the optical component determined by said processing module is the optical loss of a selected one of the connection paths.

8. A system as defined in claim 3, wherein said processing module is operative to:

a) evaluate a degree of similarity between the particular first and second measurements obtained by the first and second modules associated to a selected one of the connection paths;
   b) determine the feature of the optical component on the basis of the degree of similarity evaluated in a).

9. A system as defined in claim 8, wherein said processing module is operative to:
   a) determine a first feature when the degree of similarity is within a predetermined range;
   b) determine a second feature when the degree of similarity is outside the predetermined range.

10. A system as defined in claim 9, wherein the degree of similarity is the value obtained by subtracting the particular second measurement from the particular first measurement.

11. A system as defined in claim 9, wherein said first feature is a valid selected connection path.

12. A system as defined in claim 11, wherein said second feature is an invalid selected connection path.

13. A system as defined in claim 8, wherein the spontaneously emitted signal includes a modulation signature, the processing module being capable of:
   a) determining a first modulation signature at the first module associated to a selected connection path;
   b) determining a second modulation signature at the second module associated to a selected connection path;
   c) comparing the first and second modulation signatures to establish a degree of similarity therebetween;
   d) determining a successful communication over the selected connection path on the basis of the degree of similarity.

14. A system as defined in claim 8, wherein said processing module:
   a) determines a first modulation signature at the first module associated to the selected connection path;
   b) determines whether a second modulation signature is present at the second module associated to the selected connection path;
   c) if the second modulation signature is present at the second module associated to the selected connection path and is equivalent to the first modulation signature, said processing module determines that there has been a successful connection over the selected connection path.

15. A system as defined in claim 14, wherein if the second modulation signature is present at the second module associated to the selected connection path and is different from the first modulation signature, said processing module determines that there is a mistaken connection over the selected connection path.

16. A system as defined in claim 15, wherein if the second modulation signature is not present at the second module associated to the selected connection path, said processing module determines that there is a failed connection over the selected connection path.

17. A system as defined in claim 3, wherein the characteristic of the spontaneously emitted signal measured by the first and second modules associated to a selected one of the connection paths is optical power, and wherein the feature of the optical component determined by said processing module is power loss across the selected connection path.

18. A system as defined in claim 17, wherein the processing module is operative to evaluate a degree of similarity between the particular first and second measurements obtained by the first and second modules associated to the selected connection path, the degree of similarity being indicative of the power loss.

19. A system comprising:
   a) an optical component;
   b) at least one first module capable of obtaining a respective first measurement of a characteristic of a spontaneously emitted signal that is supplied to said optical component;
   c) at least one second module, wherein each one of said at least one second module is associated to one of said at least one first module, said at least one second module capable of obtaining a respective second measurement of the characteristic of the spontaneously emitted signal for which a respective first measurement of the characteristic was obtained by its associated first module, the respective second measurement being obtained upon reception of the spontaneously emitted signal from said optical component;
   d) a processing module in communication with said at least one first module and said at least one second module for determining a feature of said optical component based on the first and second measurements.

20. A system as defined in claim 19, wherein said at least one first module includes a plurality of first modules and said at least one second module includes a plurality of second modules.

21. A system as defined in claim 20, wherein each second module from said plurality of second modules is associated to a first module from said plurality of first modules by virtue of an associated connection path through said optical component, said processing module being capable of obtaining knowledge of all of the connection paths.

22. A system as defined in claim 21, wherein said optical component is a switch fabric.

23. A system as defined in claim 22, wherein said switch fabric is a photonic switch fabric.

24. A system as defined in claim 21, further comprising a plurality of line cards, wherein said plurality of first modules and said plurality of second modules are distributed amongst said plurality of line cards.

25. A system as defined in claim 24, wherein at least one first module is embedded on one of said plurality of line cards.

26. A system as defined in claim 24, wherein at least one second module is embedded on one of said plurality of line cards.

27. A system as defined in claim 24, wherein at least one first module and at least one second module are embedded on one of said plurality of line cards.

28. A system as defined in claim 21, wherein the feature of said optical component determined by said processing module is the validity of a selected one of the connection paths.

29. A system as defined in claim 21, wherein said processing module is operative to:
   a) evaluate a degree of similarity between the particular first and second measurements obtained by the first and second modules associated to a selected one of the connection paths;
   b) determine the feature of the optical component on the basis of the degree of similarity evaluated in a).

30. A system as defined in claim 29, wherein said processing module is operative to:
   a) determine a first feature when the degree of similarity is within a predetermined range;
   b) determine a second feature when the degree of similarity is outside the predetermined range.

31. A system as defined in claim 30, wherein the degree of similarity is the value obtained by subtracting the particular second measurement from the particular first measurement.

32. A system as defined in claim 30, wherein said first feature is the validity of the given connection path.

33. A system as defined in claim 30, wherein said second feature is the in-validity of the given connection path.

34. A system as defined in claim 29, wherein the spontaneously emitted signal includes a modulation signature, the processing module being capable of:
   a) determining a first modulation signature at the first module associated to the selected connection path;
   b) determining a second modulation signature at the second module associated to the selected connection path;
   c) comparing the first and second modulation signatures to establish a degree of similarity therebetween;
   d) determining a successful communication over the selected connection path on the basis of the degree of similarity.

35. A system as defined in claim 29, wherein said processing module:
   a) determines a first modulation signature at the first module associated to the selected connection path;
   b) determines whether a second modulation signature is present at the second module associated to the selected connection path;
   c) if the second modulation signature is present at the second module associated to the selected connection path and is equivalent to the first modulation signature, said processing module determines a successful communication over the selected connection path.

36. A system as defined in claim 35, wherein if the second modulation signature is present at the second module associated to the selected connection path and is different from the first modulation signature, said processing module determines a mistaken connection over the selected connection path.

37. A system as defined in claim 36, wherein if the second modulation signature is not present at the second module associated to the selected connection path, said processing module determines that there is a failed connection over the selected connection path.

38. A system as defined in claim 21, wherein the characteristic of the spontaneously emitted signal measured by the first and second modules associated to a selected one of the connection paths is optical power, and wherein the feature of said optical component determined by said processing module is power loss across the selected connection path.

39. A system as defined in claim 38, wherein the processing module is operative to evaluate a degree of similarity between the particular first and second measurements obtained by the first and second modules associated to the selected connection path, the degree of similarity being indicative of the power loss.

40. A system as defined in claim 21, wherein at least one first module includes an optical tap for accessing the respective spontaneously emitted signal.

41. A system as defined in claim 40, wherein said at least one optical tap diverts a portion of the respective spontaneously emitted signal to an optical power monitor.

42. A system as defined in claim 41, wherein said optical power monitor obtains the first measurement of the characteristic of the respective spontaneously emitted signal associated to the at least one first module.

43. A system as defined in claim 42, wherein said optical power monitor includes a dynamic range of greater than 30 dB.

44. A system as defined in claim 43, wherein at least one second module includes an optical tap for accessing the respective spontaneously emitted signal.

45. A system as defined in claim 44, wherein said at least one optical tap diverts a portion of the respective spontaneously emitted signal to an optical power monitor.

46. A system as defined in claim 45, wherein said optical power monitor obtains the second measurement of the characteristic of the respective spontaneously emitted signal associated to the at least one second module.

47. A system as defined in claim 46, wherein said optical power monitor includes a dynamic range of greater than 30 dB.

48. An apparatus for testing an optical component, said apparatus comprising:
   a) at least one first module capable of obtaining a respective first measurement of a characteristic of a spontaneously emitted signal that is supplied to the optical component;
   b) at least one second module, wherein each one of said at least one second module is associated to one of said at least one first module, said at least one second module capable of obtaining a respective second measurement of the characteristic of the spontaneously emitted signal for which a respective first measurement of the characteristic was obtained by its associated first module, the respective second measurement being obtained upon reception of the spontaneously emitted signal from the optical component;
   c) a processing module in communication with said at least one first module and said at least one second module for determining a feature of the optical component based on the first and second measurements.

49. An apparatus as defined in claim 48, wherein said apparatus is embedded in a line card.

50. An apparatus as defined in claim 48, wherein said apparatus includes a device that generates said spontaneously emitted signal.

51. An apparatus as defined in claim 50, wherein said device that generates said spontaneously emitted signal is an optical amplifier.

52. An apparatus as defined in claim 51, wherein said optical amplifier also functions to amplify a plurality of optical traffic signals that pass through said optical component.

53. An apparatus as defined in claim 50, wherein said device that generates said spontaneously emitted signal is embedded in a line card.

54. An apparatus as defined in claim 48, wherein said apparatus receives said spontaneously emitted signal from an external source.

55. A method for testing an optical component, comprising:
   a) obtaining at a first module a respective first measurement of a characteristic of a spontaneously emitted signal supplied to the optical component;
   b) receiving at a second module the spontaneously emitted signal from the optical component;
   c) obtaining at a second module associated to the first module a respective second measurement of the characteristic of the spontaneously emitted signal for which a first respective measurement of the characteristic was obtained by its associated first module, the respective second measurement being obtained upon reception of the spontaneously emitted signal from the optical component;
   d) comparing the first and second respective measurements of the characteristic of the spontaneously emitted signal taken at the first and second modules to determine a feature of the optical component.

56. A system for testing an optical component, said system comprising:
   a) an amplifier for supplying at least one spontaneously emitted signal to the optical component;
   b) at least one module, wherein one of said at least one modules is capable of:
      i) receiving from the optical component a respective spontaneously emitted signal; and
      ii) obtaining a measurement of a characteristic of the respective spontaneously emitted signal;
   c) a processing module in communication with said at least one module for determining a feature of the optical component based on the measurement obtained by said at least one second module.

57. A system for testing an optical component, said system comprising:
   a) first means for obtaining a first measurement of a characteristic of a selected spontaneously emitted signal that is supplied to the optical component;
   b) second means for receiving from the optical component the selected spontaneously emitted signal for which the first measurement of the characteristic was obtained, and obtaining a second measurement of the characteristic of the selected spontaneously emitted signal;
   c) processing means in communication with said first means and said second means for determining a feature of the optical component based on the first and second measurements.

* * * * *